(12) United States Patent
Zhao et al.

(10) Patent No.: US 11,938,582 B2
(45) Date of Patent: Mar. 26, 2024

(54) SCANNING DEVICE

(71) Applicant: TRIPLE WIN TECHNOLOGY (SHENZHEN) CO. LTD., Shenzhen (CN)

(72) Inventors: Ying-Quan Zhao, Shenzhen (CN); Yen-Sheng Lin, New Taipei (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 837 days.

(21) Appl. No.: 17/067,737

(22) Filed: Oct. 11, 2020

(65) Prior Publication Data
US 2022/0072668 A1   Mar. 10, 2022

(30) Foreign Application Priority Data
Sep. 9, 2020   (CN) .......................... 202010942693.1

(51) Int. Cl.
| | | |
|---|---|---|
| B23Q 7/05 | (2006.01) | |
| B23Q 7/04 | (2006.01) | |
| B23Q 7/12 | (2006.01) | |
| G06K 7/10 | (2006.01) | |
| G06K 7/14 | (2006.01) | |

(52) U.S. Cl.
CPC ................. *B23Q 7/05* (2013.01); *B23Q 7/04* (2013.01); *B23Q 7/12* (2013.01); *G06K 7/1417* (2013.01)

(58) Field of Classification Search
CPC .. B23Q 7/05; G06K 7/10376; G06K 7/10821; G06K 7/10861
USPC ....................................... 235/462.2
See application file for complete search history.

(56) References Cited

U.S. PATENT DOCUMENTS

2016/0357999 A1   12/2016   Hsieh et al.

FOREIGN PATENT DOCUMENTS

| JP | 2017038014 A | * | 2/2017 | | |
|---|---|---|---|---|---|
| TW | 201428241 A | | 7/2014 | | |
| TW | 201643767 A | | 12/2016 | | |
| TW | I571391 B | | 2/2017 | | |
| WO | WO-2008083516 A1 | * | 7/2008 | ............... | A47J 27/14 |
| WO | WO-2020125366 A1 | * | 6/2020 | ............... | G01N 33/53 |

* cited by examiner

*Primary Examiner* — Toan C Ly
(74) *Attorney, Agent, or Firm* — ScienBiziP, P.C.

(57) ABSTRACT

A scanning device includes a scanner, a fixing seat, a sensor, and a processor. The fixing seat is provided with a positioning groove for fixing a position of a workpiece. The sensor senses whether the workpiece is on the fixing base. The processor is communicatively coupled to the scanner and the sensor and used for receiving signals from the sensor and sending instructions to the scanner. If the sensor senses the workpiece on the fixing base, the processor controls the scanner to scan an identification code on the workpiece. If the sensor does not sense the workpiece on the fixing base, the processor controls the scanner to stop scanning.

18 Claims, 3 Drawing Sheets

SCANNING DEVICE

FIELD

The subject matter herein generally relates to scanning devices, and more particularly to a scanning device for automatically scanning a workpiece.

BACKGROUND

During a process of scanning a QR code on a camera module of an electronic product, a scanning efficiency is influenced by a scanning distance, a scanning angle, light interference, and a placement angle of the QR code. Manual scanning guns or fixed code scanners may have problems of low accuracy in the scanning process, which directly affects the production test efficiency.

BRIEF DESCRIPTION OF THE DRAWINGS

Implementations of the present disclosure will now be described, by way of embodiments, with reference to the attached figures.

DETAILED DESCRIPTION

Figure 1:
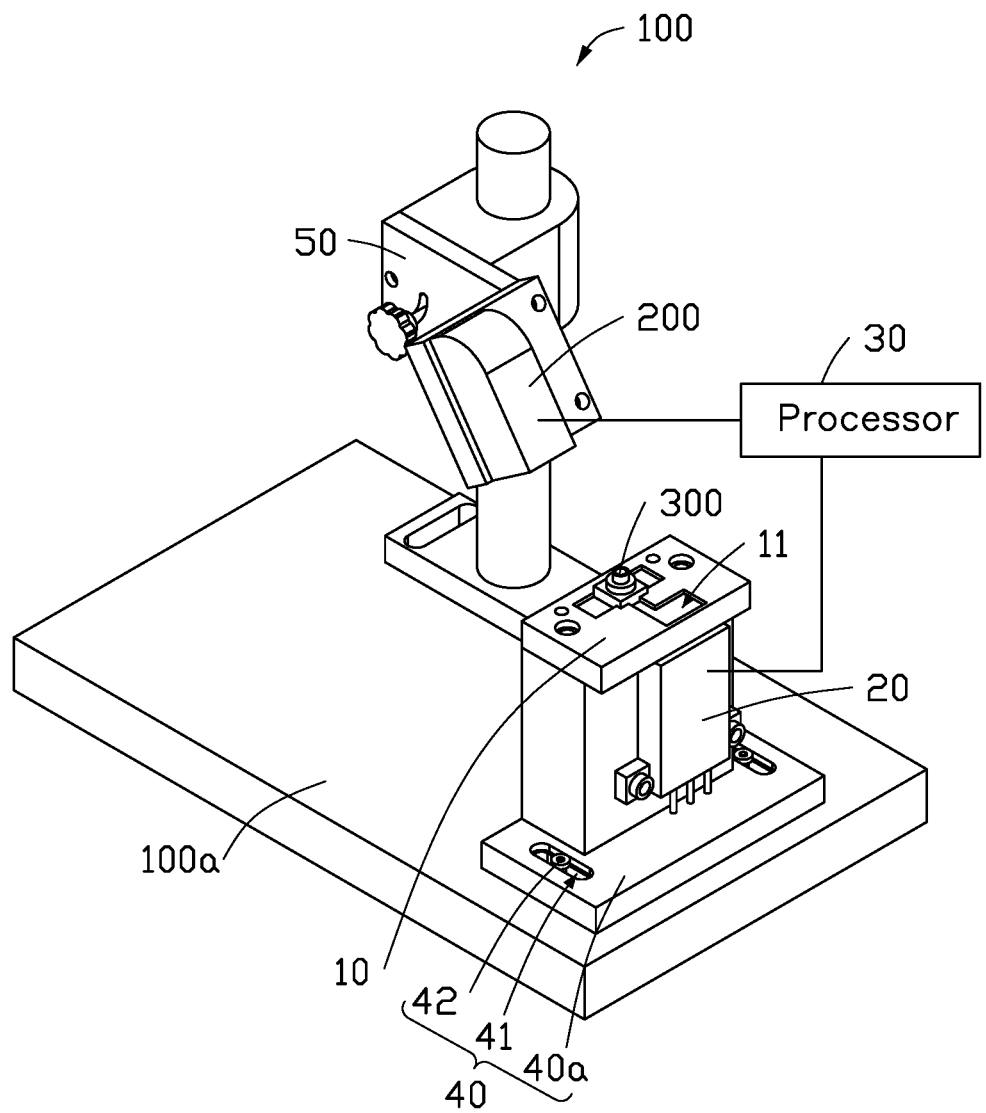
FIG. 1 is a perspective schematic diagram of a scanning device according to an embodiment of the application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows an embodiment of a scanning device 100 including a scanner 200. The scanner 200 is used to scan an identification code on a workpiece 300. The scanning device 100 further includes a fixing base 10, a sensor 20 and a processor 30. The fixing base 10 is provided with a positioning groove 11, and the positioning groove 11 is used for fixing the workpiece 300. The sensor 20 is arranged on the fixing base 10 and is used to sense whether there is a workpiece 300 on the fixing base 10 and send a signal to the processor 30. The processor 30 is communicatively coupled to the scanner 200 and the sensor 20 for receiving signals from the sensor 20 and sending instructions to the scanner 200 to control the scanner 200 to start or stop scanning. If the sensor 20 senses that the workpiece 300 is on the fixing base 10, the processor 30 controls the scanner 200 to scan the identification code on the workpiece 300. If the sensor 20 does not sense the workpiece 300 on the fixing base 10, the processor 30 controls the scanner 10 to stop scanning. In one embodiment, the sensor 20 is a photoelectric sensor, and the workpiece 300 is a mobile phone camera module.

In order to facilitate adjustment of an angle of the identification code on the workpiece 300 to improve a scanning accuracy, the scanning device 100 further includes a rotating mechanism 40. The fixing base 10 is installed on the rotating mechanism 40. The rotating mechanism 40 is used to drive the fixing base 10 to rotate around a vertical direction to drive the identification code on the workpiece 300 to rotate, so that the scanner 200 can scan the identification code more accurately.

Figure 2:
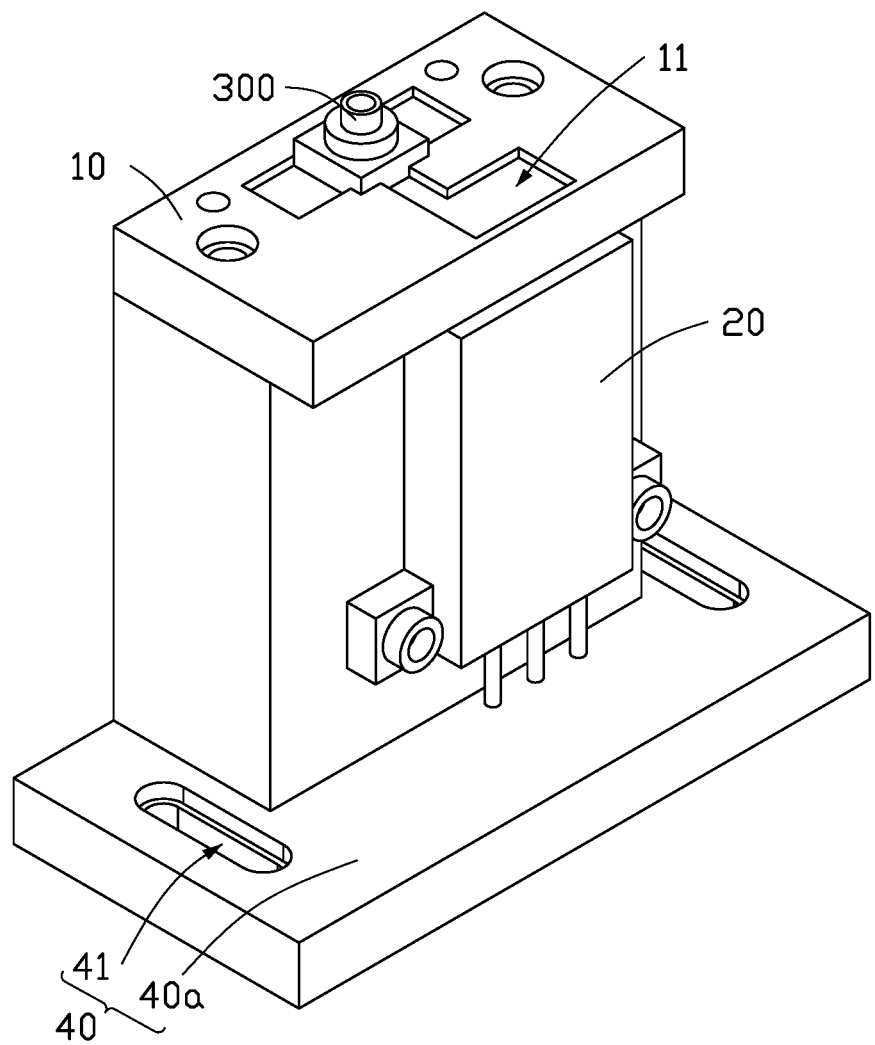
FIG. 2 is a perspective schematic diagram of a rotating mechanism and a fixing seat in FIG. 1.

Referring to FIG. 1 and FIG. 2, the scanning device 100 further includes a base 100a. The rotating mechanism 40 includes a rotating member 40a and limiting members 42. The fixing base 10 is installed on the rotating member 40a. The rotating member 40a is substantially rectangular cuboid-shaped, and sliding grooves 41 are provided adjacent to opposite ends of the rotating member 40a. Each limiting member 42 is installed on the base 100a and received in the corresponding sliding groove 41. Each sliding groove 41 is in the shape of an arc and the sliding grooves 41 are arranged around a center of the positioning slot 11. The fixing base 10 is configured to rotate around a center of the identification code on the workpiece 300, so as to ensure that the identification code is always in a scanning area and will not be outside the scanning area. The limiting members 42 are used to limit a movement and rotation angle of the fixing base 10 in a horizontal plane. In one embodiment, the limiting member 42 is a pin. An arc of the sliding grooves 41 is 20°, so that a rotation angle of the fixing base 10 ranges from −10° to 10°.

Figure 3:
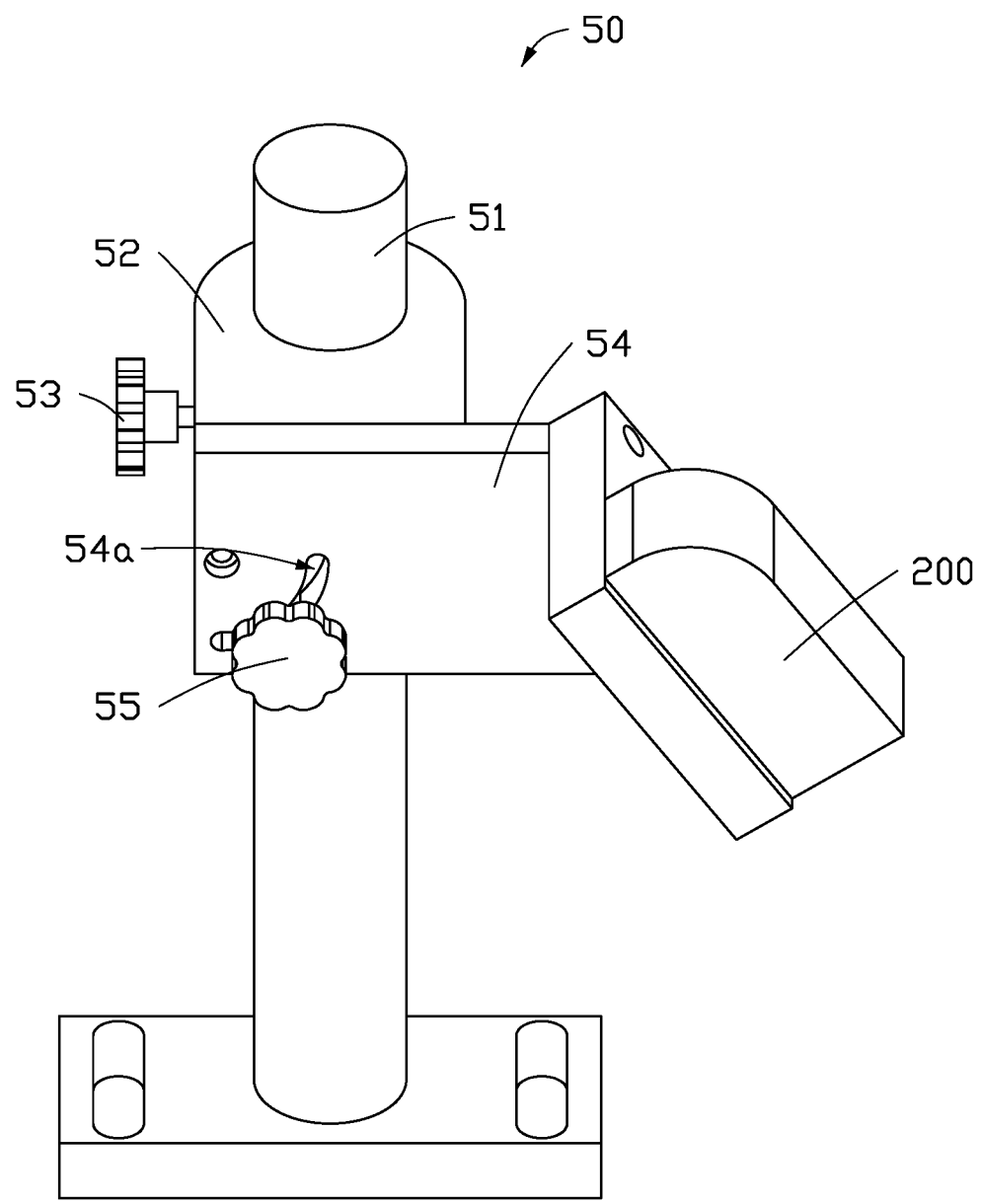
FIG. 3 is a perspective schematic diagram of an adjustment mechanism in FIG. 1.

FIG. 3 shows the scanner 200 adapted to a different position of the workpiece 300. The scanning device 100 further includes an adjustment mechanism 50, and the adjustment mechanism 50 includes a sliding rod 51, a sliding member 52, a first locking member 53, a rotating member 54, and a second locking member 55. The scanner 200 is installed on the rotating member 54. The rotating member 54 is rotationally installed on the sliding member 52, the sliding member 52 is slidably installed on the sliding rod 51, and the sliding rod 51 is vertically installed on the base 100a. The second locking member 55 is provided on the rotating member 54 for locking an angle of the rotating member 54, and the first locking member 53 is provided on the sliding member 52 for locking a height of the sliding member 52, thereby locking the angle and the height of the scanner 200.

In one embodiment, the first locking member 53 is threadedly coupled to the sliding member 52. After the first locking member 53 rotates, the sliding rod 51 is clamped between the first locking member 53 and the sliding member 52 to increase friction between the sliding member 52 and the sliding rod 51, thereby locking the height of the sliding member 52 and the height of the scanning member 200.

In one embodiment, the second locking member 55 is threadedly coupled to the sliding member 52, the rotating member 54 is provided with an arcuate groove 54a, and the second locking member 55 passes through the arcuate groove 54a. After the second locking member 55 rotates, the rotating member 54 is clamped between the sliding member 52 and the second locking member 55 to increase friction between the sliding member 52 and the rotating member 54, thereby locking the angle of the rotating member 54 and the angle of the scanner 200. Specifically, an angle range of the arcuate groove 54a is 20°-45°.

In order to improve the scanning accuracy, a color of the side of the fixing base 10 with the positioning groove 11 contrasts with a scanning light of the scanner 200, so as to improve the scanning recognition. In one embodiment, the fixing base 10 is a green fiber board, and the scanning light is red colored.

The scanning device 100 further includes a light shield (not shown) for covering the scanner 200, the adjustment mechanism 50, and the fixing base 10 to prevent interference from external light. The light shield defines an opening around the fixing base 10 to provide a window for manually adjusting the fixing base 10 or the adjustment mechanism 50.

In other embodiments, the rotating mechanism 40 can also be other structures, such as a snap-type knob or a motor driving the fixing base 10 to rotate. A shape of the positioning groove 11 can be changed according to a shape of the workpiece 300. The adjustment mechanism 50 can also be other structures, such as pneumatic slide rails, motor drives, or the like. The workpiece 300 may be other objects, such as batteries, housings, or the like.

After the scanning device 100 adjusts the height and angle of the scanner 200 through the adjustment mechanism 50, the workpiece 300 is placed on the fixing base 10, the sensor 20 senses the workpiece 300, and the processor 30 controls the scanner 200 to scan the identification code on the workpiece 300. After the workpiece 300 is taken off the fixing base 10, the processor 30 controls the scanner 200 to stop scanning, so as to achieve the purpose of automatic scanning and improving scanning accuracy.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A scanning device, comprising:
    a scanner;
    a fixing seat provided with a positioning groove configured to fix a position of a workpiece;
    a sensor; and
    a processor communicatively coupled to the scanner and the sensor, and is configured to receive signals from the sensor and send instructions to the scanner; wherein:
    if the sensor senses a workpiece on the fixing base, the processor controls the scanner to scan an identification code on the workpiece; and
    if the sensor does not sense a workpiece on the fixing base, the processor controls the scanner to stop scanning.

2. The scanning device of claim 1 further comprising a rotating mechanism, wherein:
    the fixing base is on the rotating mechanism, the rotating mechanism being configured to drive the fixing base to rotate the identification code on the workpiece, and the scanner scans the identification code.

3. The scanning device of claim 2 further comprising a base, wherein:
    the rotating mechanism comprises a rotating member and limiting members;
    the fixing base is on the rotating member;
    the rotating member comprising sliding grooves adjacent to each of two ends of the rotating member;
    each of the limiting members is installed on the base and received in a corresponding one of the sliding grooves; and
    the limiting members being configured for limiting a movement and rotation angle of the rotating member.

4. The scanning device of claim 3, wherein:
    the rotation angle of the rotating member ranges from −10 degree to 10 degree.

5. The scanning device of claim 1, further comprising a base and an adjustment mechanism, wherein:
    the adjustment mechanism comprises a sliding rod, a sliding member, a first locking member, a rotating member, and a second locking member;
    the scanner is mounted on the rotating member;
    the rotating member is rotationally mounted on the sliding member;
    the sliding member is slidably mounted on the sliding rod;
    the sliding rod is mounted vertically on the base;
    the second locking member is on the rotating member, and configured to lock an angle of the rotating member; and
    the first locking member is on the sliding member, and configured to lock a height of the sliding member.

6. The scanning device of claim 5, wherein:
    the first locking member is threadedly coupled to the sliding member; and
    the first locking member rotates to clamp the sliding rod to lock the height of the sliding member.

7. The scanning device of claim 6, wherein:
    the second locking member is threadedly coupled to the sliding member; and
    the second locking member rotates to clamp the rotating member to lock the angle of the rotating member.

8. The scanning device of claim 1, wherein:
    a color of a side of the fixing seat with the positioning groove contrasts with a color of a scanning light of the scanner.

9. The scanning device of claim 1, wherein:
    the rotation angle of the rotating member ranges from 20 degree to 45 degree.

10. A scanning device, comprising:
    a scanner rotatable around an imaginary first axis;
    a fixing seat provided with a positioning groove, the positioning groove used to fix a position of a workpiece, and the fixing seat rotatable about a second axis perpendicular to the first axis;
    a sensor for sensing whether the workpiece is on the fixing base; and
    a processor communicatively coupled to the scanner and the sensor, and used for receiving signals from the sensor and sending instructions to the scanner; wherein:

if the sensor senses the workpiece on the fixing base, the processor controls the scanner to scan an identification code on the workpiece; and if the sensor does not sense the workpiece on the fixing base, the processor controls the scanner to stop scanning.

11. The scanning device of claim 10, further comprising a rotating mechanism, wherein:
the fixing base is installed on the rotating mechanism; and
the rotating mechanism is used to drive the fixing base to rotate about the second axis to rotate the identification code of the workpiece, and the scanner scans the identification code.

12. The scanning device of claim 11, further comprising a base, wherein:
the rotating mechanism comprises a rotating member and limiting members;
the fixing base is installed on the rotating member;
the rotating member is provided with sliding grooves adjacent to two ends of the rotating member;
each limiting member is installed on the base and received in the corresponding sliding groove; and
the limiting members are used for limiting a movement and rotation angle of the rotating member.

13. The scanning device of claim 12, wherein:
the rotation angle of the rotating member ranges from −10° to 10°.

14. The scanning device of claim 10, further comprising a base and an adjustment mechanism, wherein:
the adjustment mechanism comprises a sliding rod, a sliding member, a first locking member, a rotating member, and a second locking member;
the scanner is mounted on the rotating member;
the rotating member is rotationally mounted on the sliding member;
the sliding member is slidably mounted on the sliding rod;
the sliding rod is mounted vertically on the base;
the second locking member is provided on the rotating member to lock an angle of the rotating member; and
the first locking member is provided on the sliding member to lock a height of the sliding member.

15. The scanning device of claim 14, wherein:
the first locking member is threadedly coupled to the sliding member; and
the first locking member rotates to clamp the sliding rod to lock the height of the sliding member.

16. The scanning device of claim 15, wherein:
the second locking member is threadedly coupled to the sliding member; and
the second locking member rotates to clamp the rotating member to lock the angle of the rotating member.

17. The scanning device of claim 10, wherein:
a color of a side of the fixing seat with the positioning groove contrasts with a color of a scanning light of the scanner.

18. The scanning device of claim 10, wherein:
the rotation angle of the rotating member ranges from 20° to 45°.

* * * * *